No. 744,113. PATENTED NOV. 17, 1903.
A. M. RYE.
BUGGY ATTACHMENT.
APPLICATION FILED MAY 28, 1903.
NO MODEL.
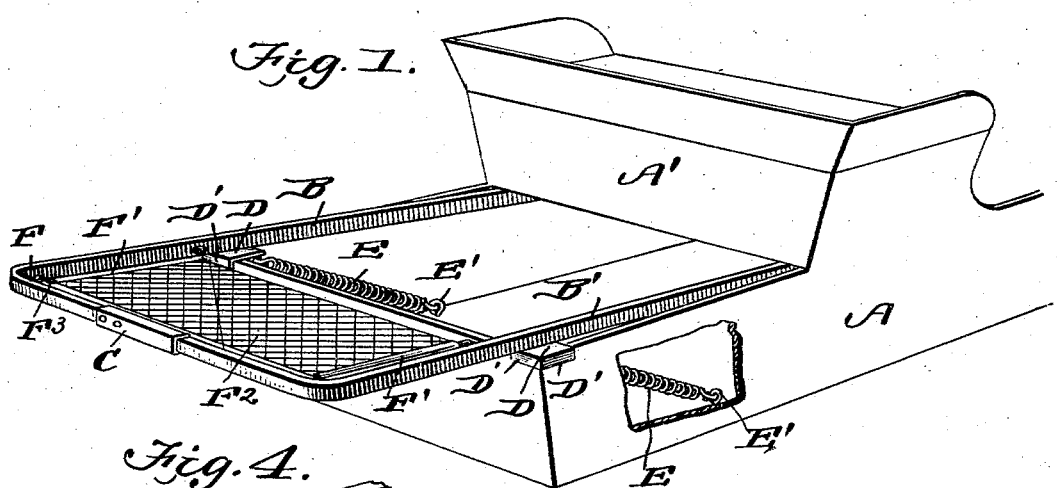
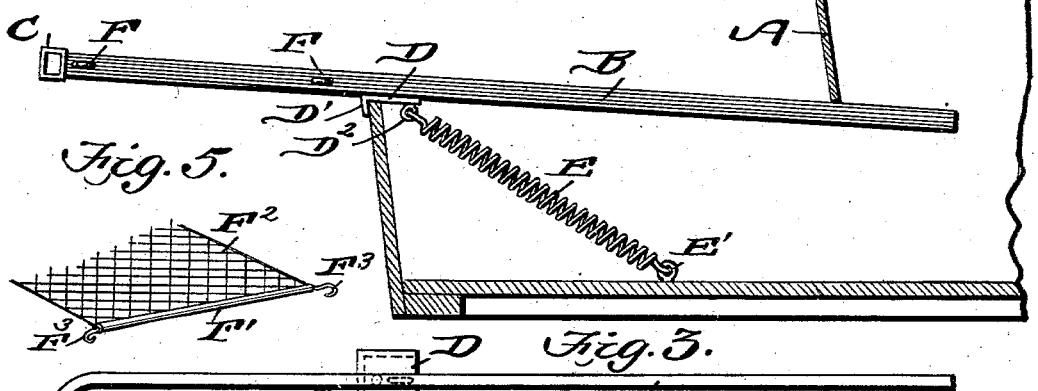
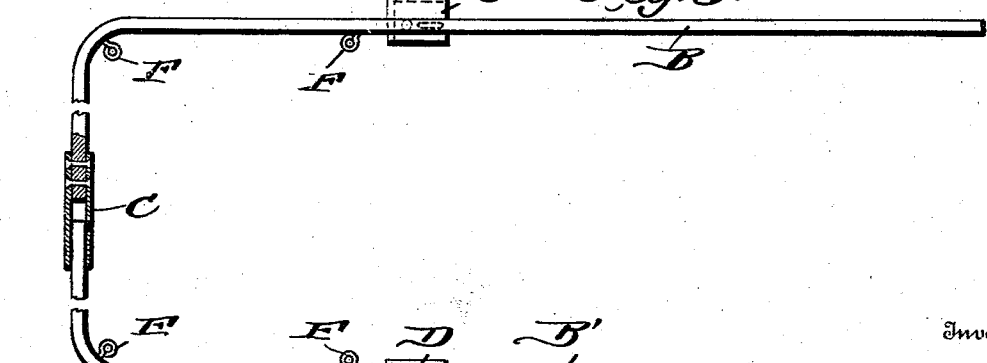
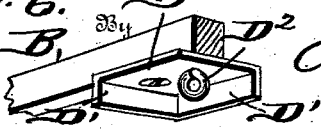
Witnesses
Inventor
A. M. Rye.
By O'Meara & Brock,
Attorneys No. 744,113. Patented November 17, 1903.

UNITED STATES PATENT OFFICE.

ALFORD M. RYE, OF GEORGETOWN, OHIO, ASSIGNOR OF ONE-HALF TO E. E. DAVIS, OF GEORGETOWN, OHIO.

BUGGY ATTACHMENT.

SPECIFICATION forming part of Letters Patent No. 744,113, dated November 17, 1903.

Application filed May 28, 1903. Serial No. 159,179. (No model.)

*To all whom it may concern:*

Be it known that I, ALFORD M. RYE, a citizen of the United States, residing at Georgetown, in the county of Brown and State of Ohio, have invented a new and useful Buggy Attachment, of which the following is a specification.

My invention is an attachment for buggies; but it will be obvious that it can be applied to any vehicle having a seat adjacent the rear end. In the majority of buggies a very limited space is allowed between the seat or rear seat in a double-seated buggy and the end of the box-frame. This space is rarely large enough for even a small-sized trunk or large valise, and the inconvenience of placing such articles of baggage in the front of the buggy is apparent.

The object of my invention is to provide a detachable baggage-carrier which can be quickly and easily secured to the rear portion of a vehicle and as quickly and easily removed when not required.

My invention consists of an open rectangular frame the forward ends of which are held beneath the seat, the side members of the frame being supported intermediate their ends by the rear end of the box-frame of the vehicle, and means for holding said frame against movement relative to the vehicle.

My invention consists also in the novel features of construction and combination of parts described hereinafter, particularly pointed out in the claims, and shown in the accompanying drawings, in which—

Figure 1 is a perspective view showing my device in position for use. Fig. 2 is a longitudinal section, the screen being removed. Fig. 3 is a plan view of the frame, the screen being removed; and Figs. 4, 5, and 6 are perspective views showing details of construction.

In the drawings, A represents the box-frame of a buggy, and A' the seat.

In constructing my attachment I employ a sectional frame comprising the members B and B', the said members having their rear portions bent toward each other. On the inwardly-turned end of the member B is rigidly secured a sleeve C, into which the rear end of the member B' slides. On the under side of each member is secured a metal plate D, the rear and outer edges of each plate having depending flanges D'. An eye $D^2$ is also secured to each plate. These flanges fit over the corners of the rear end of the box-frame and prevent forward and inward movement of the members B and B'. To prevent movement in other directions and to hold the flanges firmly against the corners of the frame, a coil-spring E is secured at one end to the eye of each plate, the opposite ends of the springs being secured to an eye E', arranged in the bottom of the vehicle.

To the rear of the end-board of the vehicle eyes F are secured on the inner sides of the members B B', and a rectangular flexible screen, comprising the end pieces F' and the network body $F^2$, is adapted to fit within the frame composed by the members B B' to the rear of the box-frame, being held in place by hooks $F^3$, which engage the eyes F. These hooks extend to one side of the screen, so that when the latter is rolled up the hooks will project from the ends of the roll.

It is obvious that the frame comprising the members B and B' can be used without the screen, the latter being used when small packages are carried.

The forward ends of the members B B' extend under the seat and bear against the under side of same, and it is obvious that the heavier the load the more firmly the attachment will be held in place. The sleeve C permits the member B' to be adjusted relative to the member B, thereby adapting the device for buggies of different widths.

Having thus fully described my invention, what I claim as new, and desire to secure by Letters Patent, is—

1. A device of the kind described comprising an open, rectangular frame having flanged plates carried by its side members, the flanges of said plates fitting over the corners of a vehicle box-frame, and the forward ends of the said members extending beneath and resting against the under side of the vehicle-seat.

2. A device of the kind described comprising a sectional frame having laterally-adjustable side members, said members bearing on the rear end of a vehicle box-frame intermediate their ends and their forward ends engaging the under side of the vehicle-seat.

3. A device of the kind described comprising a sectional frame having adjustable side members, flanged plates secured to the under sides of said members intermediate their ends, said flanges fitting over the corners of the rear end of a vehicle, the forward ends of the side members extending beneath the vehicle-seat, and coiled springs secured at one end to the body of the vehicle and at the opposite end to said side members.

4. A buggy attachment comprising an open, rectangular frame, means carried by said frame for adjusting the side members of said frame with reference to their distance apart, plates secured on said side members intermediate their ends and having flanges adapted to fit over the corners of the box-frame of a buggy, eyes secured on the inner sides of the rectangular frame to the rear of the plates, a screen adapted to fit within said frame to the rear of the plates, and hooks carried by the screen and adapted to engage the eyes carried by the frame.

ALFORD M. RYE.

Witnesses:
H. P. SHELTON,
F. A. SPENCER.